(12) United States Patent
Bennett

(10) Patent No.: US 11,691,583 B1
(45) Date of Patent: Jul. 4, 2023

(54) SIDE UNDERRIDE GUARDS

(71) Applicant: Utility Trailer Manufacturing Company, City of Industry, CA (US)

(72) Inventor: Jeffrey J. Bennett, South Pasadena, CA (US)

( * ) Notice: Subject to any disclaimer, the term of this patent is extended or adjusted under 35 U.S.C. 154(b) by 258 days.

(21) Appl. No.: 17/330,859

(22) Filed: May 26, 2021

Related U.S. Application Data

(63) Continuation-in-part of application No. 17/177,791, filed on Feb. 17, 2021, now abandoned.

(51) Int. Cl.
*B60R 19/56* (2006.01)
*B60R 19/42* (2006.01)
*B62D 35/00* (2006.01)

(52) U.S. Cl.
CPC .......... *B60R 19/565* (2013.01); *B60R 19/42* (2013.01); *B62D 35/001* (2013.01)

(58) Field of Classification Search
CPC ..... B60R 19/565; B60R 19/42; B60R 35/001; B62D 35/001
See application file for complete search history.

(56) References Cited

U.S. PATENT DOCUMENTS

| 10,549,797 B2 | 2/2020 | Ehrlich et al. |
| 10,940,817 B2 | 3/2021 | Kunkel et al. |
| 10,946,824 B2 | 3/2021 | Kunkel et al. |
| 2002/0047281 A1 | 4/2002 | Hartel |
| 2003/0218343 A1 | 11/2003 | Sato |
| 2004/0032133 A1 | 2/2004 | Bird |
| 2006/0028032 A1 | 2/2006 | Henseleit |
| 2010/0264691 A1* | 10/2010 | Giromini ............. B62D 25/168 296/180.4 |
| 2014/0054924 A1* | 2/2014 | Pfaff ...................... B62D 35/02 296/180.4 |
| 2015/0076846 A1 | 3/2015 | Musale |
| 2016/0207484 A1* | 7/2016 | Rogers ................. B60R 19/565 |
| 2016/0304043 A1 | 10/2016 | Williams |
| 2018/0118143 A1* | 5/2018 | Ponder ................ B62D 35/001 |
| 2019/0256026 A1* | 8/2019 | Kunkel ................ B60R 19/565 |
| 2020/0269789 A1* | 8/2020 | Ponder ................ B60R 19/565 |

(Continued)

FOREIGN PATENT DOCUMENTS

| CA | 3017256 A1 * | 3/2019 | .......... B60R 19/565 |
| JP | H106892 A | 1/1998 | |

(Continued)

OTHER PUBLICATIONS

U.S. Appl. No. 16/712,807, filed Dec. 12, 2019—Underride Guard (allowed).

*Primary Examiner* — Lori Lyjak
(74) *Attorney, Agent, or Firm* — Karish & Bjorgum, PC

(57) ABSTRACT

Vertical bars extend downwardly from the structural siderails of a trailer frame to a guard bar extending parallel to the longitudinal axis of the trailer, thus forming a side underride guard. Two side underride guards are fixed to the structural siderails of the trailer. The guard bars are located vertically below the bed of the trailer to have an effective ground clearance of twenty-seven inches. Lateral bracing of each guard bar extends from the guard bar to the structural siderail across the trailer. Bracing at the trailing end of the side underride guards employs a K-brace to provide an air brake hose non-chafing zone. The K-brace is displaced from the trailer bed.

9 Claims, 5 Drawing Sheets

(56) References Cited

U.S. PATENT DOCUMENTS

2022/0009436 A1\* 1/2022 Watson ................... B60R 19/54
2022/0063535 A1\* 3/2022 Batzer ................... B60R 19/565

FOREIGN PATENT DOCUMENTS

| JP | H1016681 A | 1/1998 |
| JP | 2011126399 A | 10/2011 |
| KR | 20170062029 A | 6/2017 |
| WO | WO-2013005465 A1 | 1/2013 |
| WO | WO-2015080086 A1 | 6/2015 |

\* cited by examiner

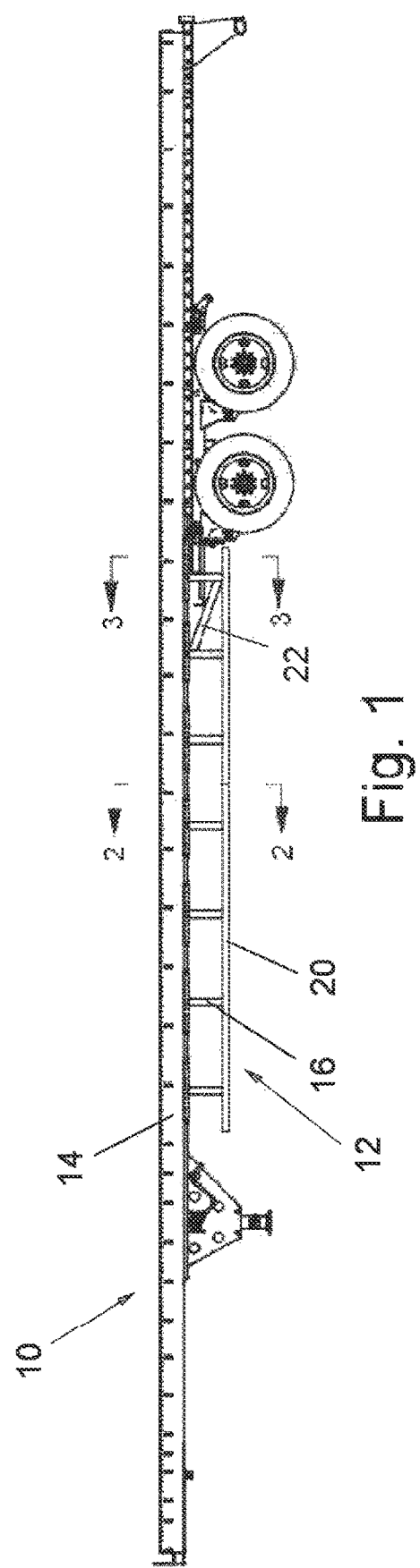
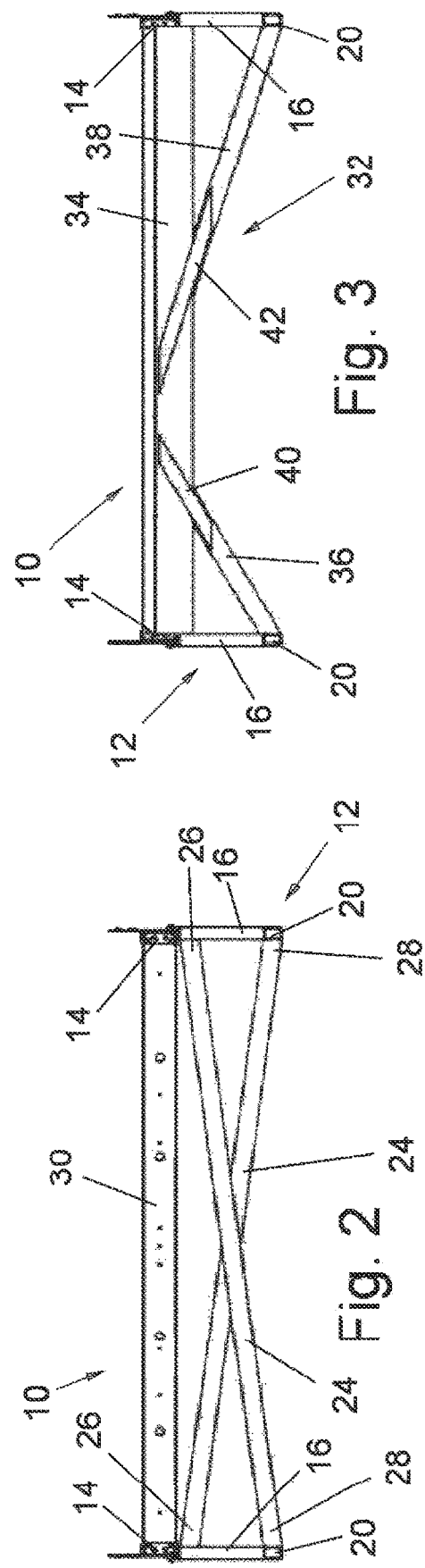

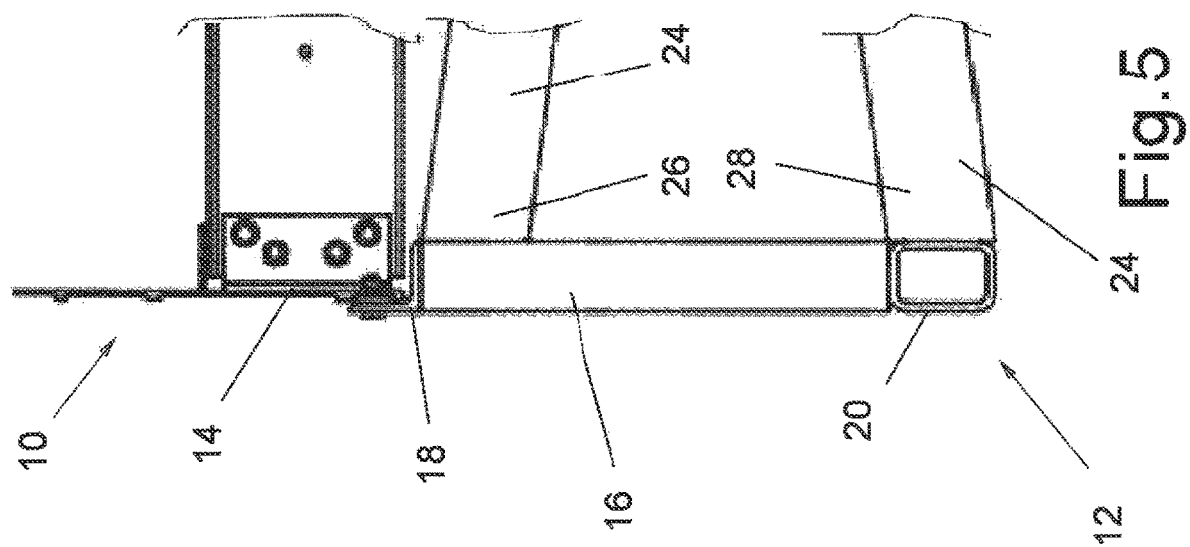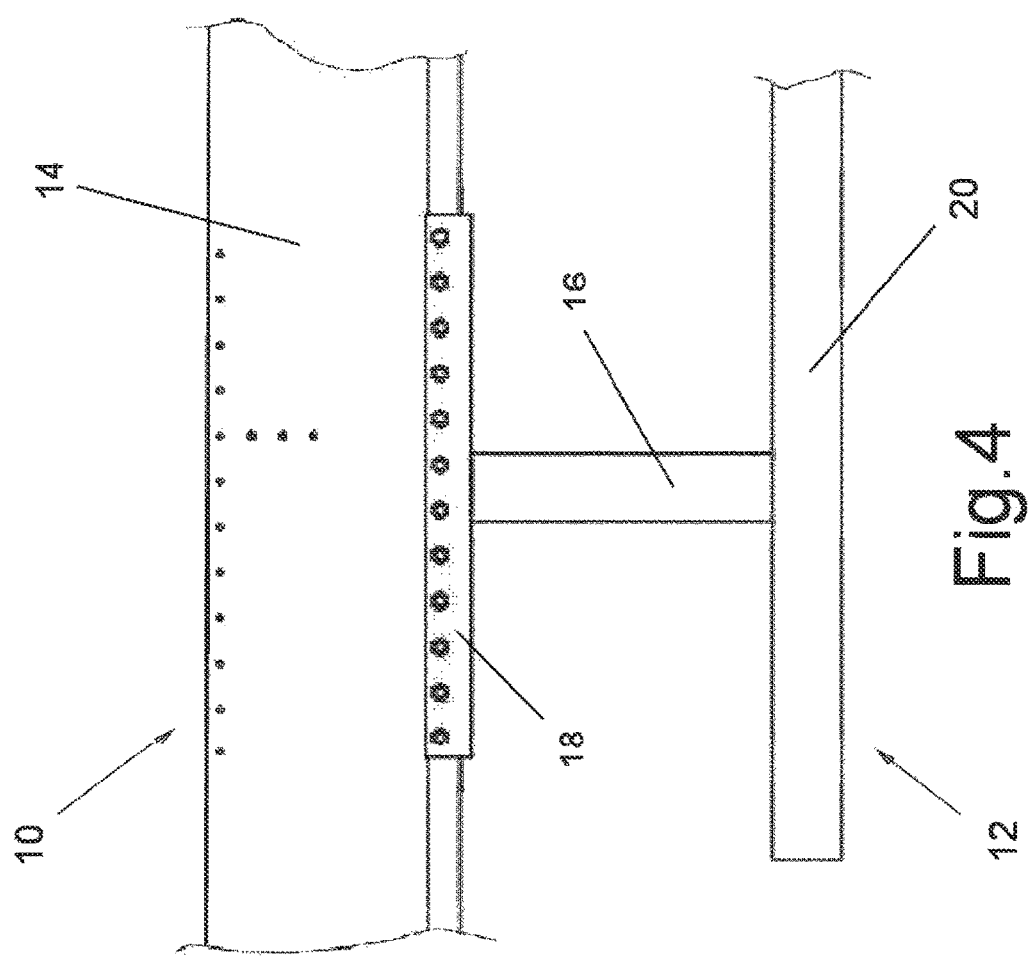

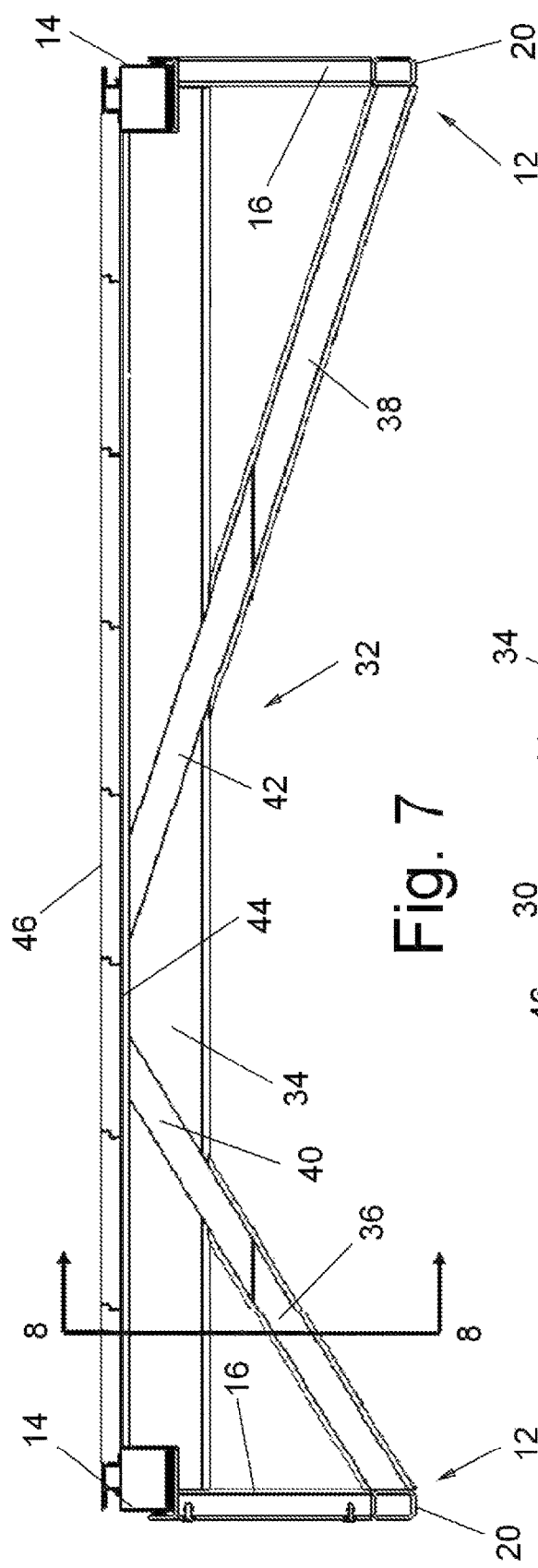
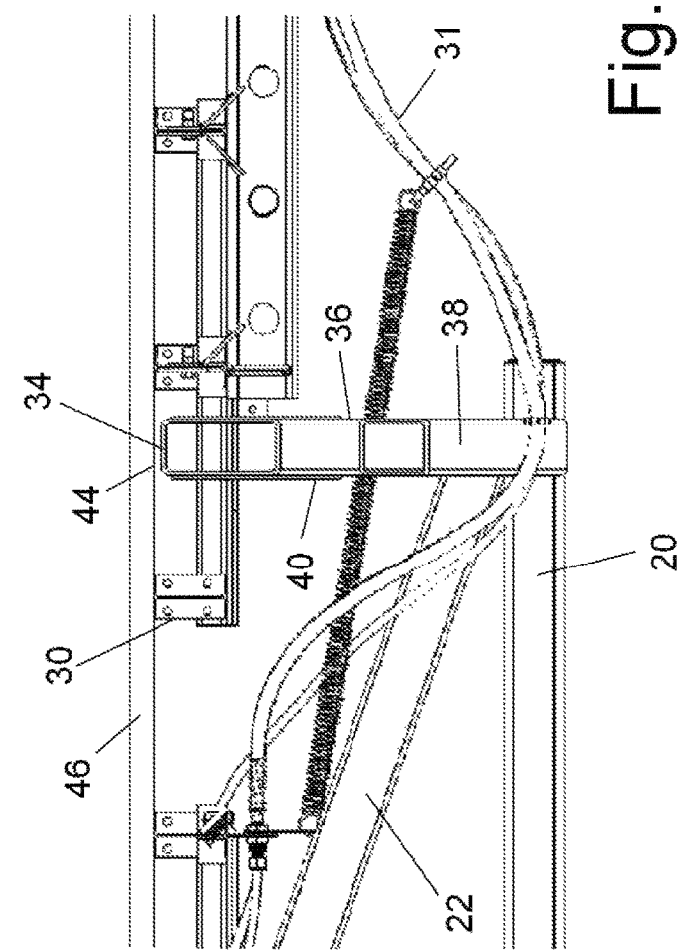

SIDE UNDERRIDE GUARDS

BACKGROUND OF THE INVENTION

The field of the present invention is vehicle accident mitigation.

Rear Underrun Protection Systems known as underride guards are rigid assemblies at the rear of vehicles including trailers and semi-trailers. The Federal Department of Transportation has mandated these assemblies through NHTSA REGULATIONS FMVSS 223 and 224 with the intention that the bars will interfere with automobiles running under such high, heavy vehicles in a rear end collision. The object of the Federal Regulations is to reduce the likelihood of impact of the vehicle frame with the automobile passenger compartment. The rigid assemblies typically include vertical brackets depending from the vehicle to support a horizontal bar extending the width thereof. The length of the bars and ground clearance are dictated by the regulations to receive the structural areas of an automobile bumper and crumple zone. The mandated clearance is enabled by the proximity of the guards to the rear wheels, making ground contact of the horizontal bar highly unlikely.

Side underride guards have not been mandated by NHTSA regulations even though there is some possibility of side underride from automobiles intersecting such high, heavy vehicles from substantial angles. Of course, nothing can avert predictable disaster at extreme impact speeds. With side underride guards, the guards, by definition, would extend to a significant distance between the vehicle front and rear wheels. Such side underride guards adhering to the NHTSA regulations for rear underride guards would make any trailer subject to recurrent high centering during normal operation. The problem of high centering is regularly encountered with aerodynamic side skirts on such vehicles, requiring a compromise between side skirt flexibility and aerodynamic effectiveness. With a rigid restraint, a similar solution is not available.

SUMMARY OF THE INVENTION

The present invention is directed to a side underride guard for vehicles including trailers for tractor-trailer rigs.

In a first aspect of the present invention, the side underride guard has an effective ground clearance on flat ground that is above bumpers and tires of the standard automobile as defined by the NHTSA but within the tire lift zone of wheel wells and below the top of structural elements at the back of the engine compartment. As a result, the body of the automobile and its frame below the windshield will reduce the likelihood of intrusion of the vehicle frame into the automobile passenger compartment.

The side underride guard includes vertical bars extending downwardly from the structural siderail of the trailer. A guard bar extending longitudinally of the vehicle is fixed below the vehicle structural siderail to the lower ends of the vertical bars. The guard bar is to have a maximum effective ground clearance of twenty-seven inches.

In a second aspect of the present invention, the side underride guard includes vertical bars extending downwardly from the structural siderail of the trailer. A guard bar extending longitudinally of the vehicle is fixed below the vehicle structural siderail to the lower ends of the vertical bars. Lateral bracing extends between the structural siderails and the guard bars. The lateral bracing includes bracing bars fixed at one end to one of the structural siderails and to one of the guard bars at the lower end of the vertical bars at the other end, respectively. By having the bracing extend to the structural siderails, stress raisers in the trailer bed are mitigated upon an impact on the guard bar, which can occur if support is affixed to the trailer bed. Such stress raisers would compromise the flexibility of the vehicle bed to adjust under cargo loads.

In a third aspect of the present invention, a side underride guard includes a K-brace adjacent one end of the guard bars that has a brace beam structurally extending between the two siderails, which is spaced from the bed of the trailer and the trailer cross beams. The K-brace further has two struts extending to the guard bars defining an air brake hose non-chafing zone between the two struts. The K-brace is unaffected by trailer bed flexure while providing support for the guard bars.

In a fourth aspect of the present invention, leaf springs extend downwardly on either side of the trailer to mount the aerodynamic side skirts. The springs do not extend past the side guard bars and are attached at their lower ends to the side skirts. The leaf springs can resist the aerodynamic load on the side skirts, which at speed pulls the side skirts outwardly from the trailer. With the side guard bars and the leaf springs restraining the side skirts, these skirts can be more flexible below the side underride guards to accommodate inevitable high centering.

Accordingly, it is an object of the present invention to provide an improved side underride guard. Other and further objects and advantages will appear hereafter.

BRIEF DESCRIPTION OF THE DRAWINGS

FIG. 1 is a side view of a trailer with a side underride guard;

FIG. 2 is a cross-sectional view of the side underride guards taken along lines 2-2 of FIG. 1;

FIG. 3 is a cross-sectional view of the side underride guards taken along lines 3-3 of FIG. 1;

FIG. 4 is a detail of a portion of FIG. 1;

FIG. 5 is a detail of a portion of FIG. 2;

FIG. 7 is a front view of a K-brace assembly;

FIG. 8 is a cross-sectional view of the K-brace assembly taken along line 8-8 of FIG. 7 illustrating air brake hose equipment;

DETAILED DESCRIPTION OF THE PREFERRED EMBODIMENT

Figure 6:
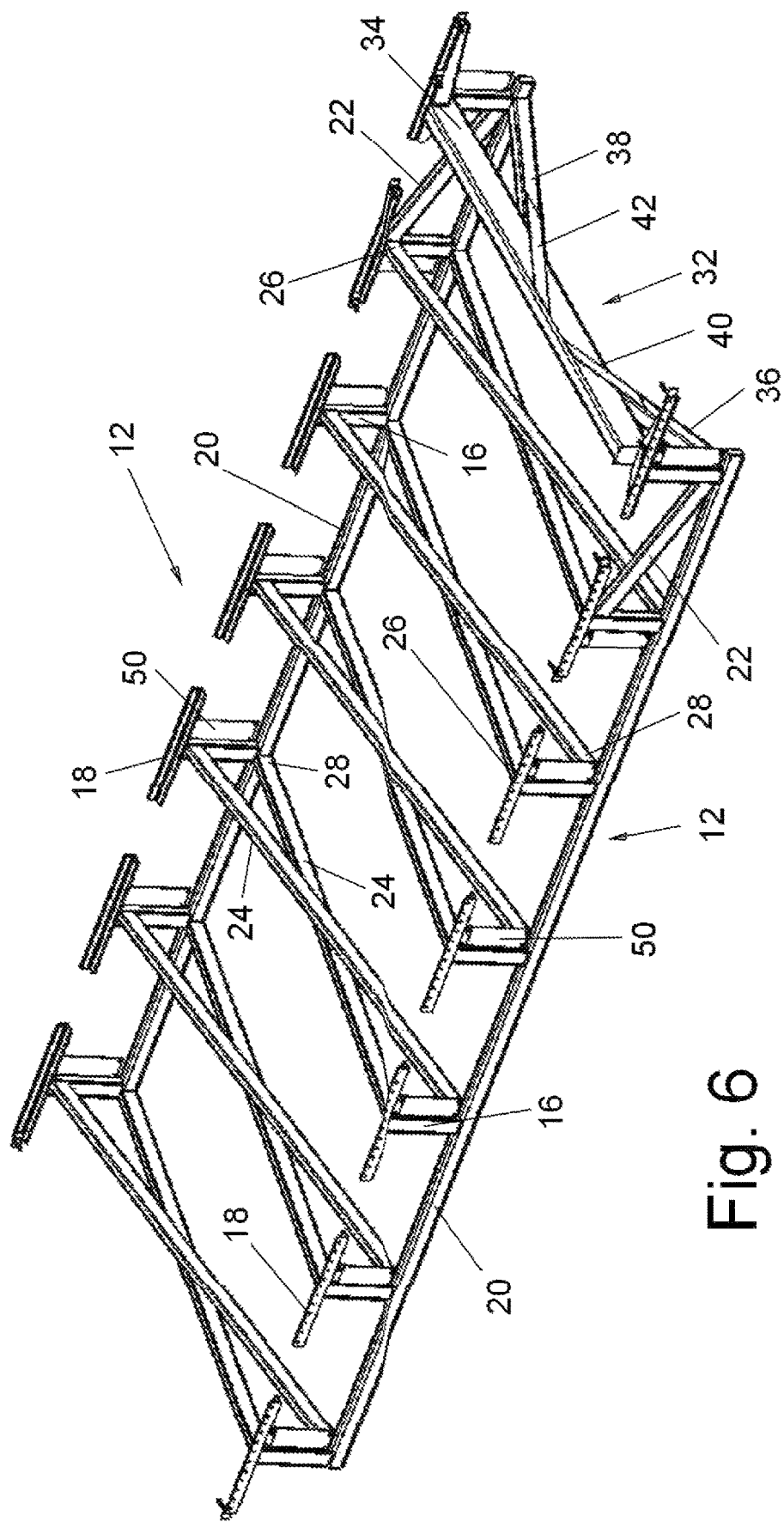
FIG. 6 is an isometric view of the side underride guard assembly.
Figure 9:
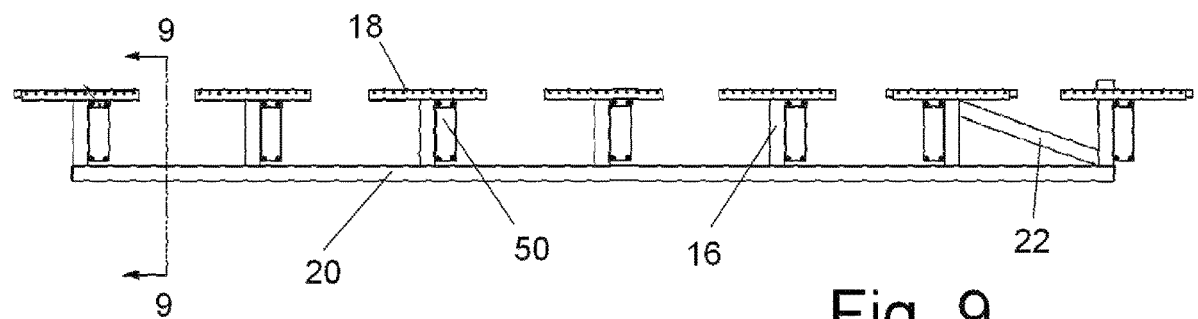
FIG. 9 is a side view of the side underride guard assembly with side skirt springs.

Turning in detail to the figures, a trailer 10 for tractor-trailer rigs is illustrated in FIG. 1. This trailer 10 may be a vehicle with trucks at each end or only at the rear end in the form of a semi-trailer, either being associated with a tractor-trailer rig. Both such vehicle configurations are here referred to as a trailer. Such trailers are high and heavy and automobiles can underride the trailer in a collision. The trailer 10 includes side underride guards 12 parallel to the longitudinal axis of the trailer 10. The side underride guards 12 are attached to structural siderails 14 that support the trailer bed at the sides thereof. The side underride guards 12 reduce the likelihood of an automobile driven into the side of the trailer 10 continuing thereunder such that the passenger area of the automobile reaches the structural siderails 14 of the frame of the trailer 10.

The side underride guards 12 include vertical bars 16 affixed to the structural siderails 14 and depending downwardly therefrom. On each side of the trailer, the vertical bars 16 are spaced apart to good effect and are shown in this embodiment to be welded at their upper ends to mounting angles 18, which are in turn bolted to the structural siderails 14 at trailer bed cross beams. Guard bars 20 are rigidly attached to the vertical bars 16 at their lower ends and extend parallel to the centerline of the trailer 10. Diagonal braces 22 are included to resist in-plane shear forces on each underride guards 12.

No standard for side guard bars has been established by NHTSA regulation, understanding that the NHTSA regulations for rear underride guards are intended for the underride bar to meet an Insurance Institute for Highway Safety (IIHS) standard that is low enough to engage the structural front end of a vehicle. At a ground clearance level for side underride guards to meet such a standard, high centering of the trailer 10 on such a side guard bar would repeatedly occur in use. However, confirmed by testing, a guard bar 20 on the side of a trailer at an effective ground clearance of twenty-seven inches has been found to arrest an IIHS standard test automobile by engaging first the sheet metal and then the structure of the automobile below the windshield even though the structural front end of the vehicle is not engaged.

To achieve this effective ground clearance, the guard rails are to be located about seventeen inches below the structural siderails 14 of a typical trailer 10 at least at their highest point where high centering is most problematic. Effective ground clearance is to be understood in this context as measured between the bottom of the guard bars 20 and a level ground surface with the trailer unloaded, running wheels and tires designed for highway use and a suspension configuration effected at highway speeds. Variations in tire pressure, tread depth, trailer weight and load and the like affecting trailer ground clearance are understood to be within the effective range of the nominal twenty-seven inches of effective ground clearance. The guard bars 20 do not need to extend fully to the wheels and tires of a trailer or tractor-trailer rig as those components are virtually impenetrable to vehicle underride. Further, the wheel assembly often is designed to slide fore and aft to accommodate various configurations, weight distributions, and highway regulations.

The underride guards are principally designed to arrest vehicles that impact the trailer in the space between the wheels and tires. The ground clearance of the guard bars 20 may also be reduced toward the wheels and tires of some vehicles as the likelihood of high centering may diminish. However, the lower the guide bar, the more interference with trailer side skirt flexure will be encountered.

The side underride guards 12 are supported by lateral bracing between the structural siderails 14. Bracing bars 24 extend from anchor ends 26 welded to the upper ends of the vertical bars 16, in turn fixed to the structural siderails by the mounting angles 18, as best seen in FIG. 5, to attachment ends 28 fixed to the guard bars 20. The bracing bars 24 are paired with one bar 24 extending laterally across the trailer 10 from each structural siderail 14 at a structural cross beam 30 of the trailer 10 beneath the trailer bed. The paired bracing bars 24 are welded together at their intersection for added rigidity and strength. The bracing bars 24 also are attached at the attachment ends to the guard bars 20 at the lower end of the vertical bars 16. In the preferred embodiment, the mounting angles 18, the vertical bars 16, the guard bars 20 and the bracing bars 24 are all welded into an integral unit. The unit is then bolted to the structural siderails 14 and the end clips of the cross beams 30. All of the bars are tubular in construction.

The lateral bracing most adjacent the rear truck of the trailer must employ a different design to meet Department of Transportation requirements. An air brake hose 31 non-chafing zone is required centrally of the trailer ahead of the rear truck. To define this zone, a K-brace 32 is used to brace the trailing portion of the guard bars 20.

The K-brace 32 includes a brace beam 34 structurally extending across between the structural siderails 14. Struts 36, 38 structurally extend from the attachment to the guard bars 20 to the brace beam 34. The struts 36, 38 are tubular and extend to the underside of the brace beam 34. Straps 40, 42 are welded to either side of the struts 36, 38 and to either side of the brace beam 34. This K-brace 32 is incorporated into the weldment forming the side underride guards 12.

The brace beam 34 is independently positioned of the most adjacent cross beam(s). The cross beams 30 support the bed of the trailer 10. However, the brace beam 34 is not to support the bed. The brace beam 34 is displaced downwardly from the bed of the trailer 10 by a space 44. The space 44 provides a gap sufficient that the brace beam 34 will not be contacted by the bed of the trailer 10 when the bed 46 is flexed under load, such as by the weight of cargo or a fork lift or by flexing of the trailer in transit.

Figure 10:
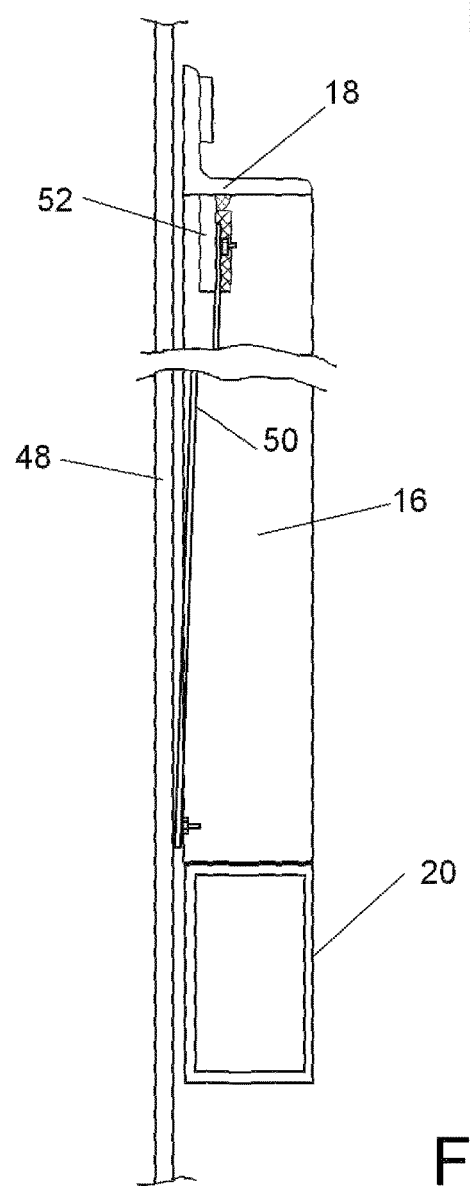
FIG. 10 is a cross-sectional view of the side underride guard assembly of FIG. 9 taken along line 10-10 of FIG. 9 with a side skirt.

Modern trucking frequently requires side skirts depending from the body of the truck. FIG. 10 illustrates a side skirt 48 in edge view along the side of the trailer 10. The skirts 48 depends below the guard bars 20 on both sides of the trailer 10. The skirts 48, being somewhat flexible, are drawn outwardly by differential static pressure across each skirt when the trailer 10 is moving. Leaf springs 50 depend from brackets 52 welded to the mounting angles 18 and an adjacent vertical bar 16. The side skirts 48 are in turn bolted to the leaf springs 48, including adjacent the lower ends of the leaf springs 50 and guard bars 20. The leaf springs 50 are shown to terminate at or above the guard bars 20. With the constraints provided by the guard bars 20 and the leaf springs 50, the side skirts may be more flexible than otherwise needed.

Thus, an improved side underride guard for vehicles has been described. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. Side underride guards for a tractor-trailer rig having two structural siderails, cross beams extending between the structural siderails and a bed supported by the cross beams on the trailer, comprising vertical bars extending downwardly from the structural siderails, each vertical bar having an upper end and a lower end, the upper ends of the vertical bars being fixed to the structural siderails;

two guard bars extending beneath the two structural siderails, respectively, and fixed to the lower ends of the vertical bars to have an effective ground clearance of no more than twenty-seven inches;

lateral bracing of the guard bars, the lateral bracing including bracing bars, each bracing bar having an anchor end and an attachment end, the anchor ends being fixed to the upper ends of the vertical bars and the attachment ends being fixed to the guard bars at the lower ends of the vertical bars and traversing the bed between the anchor ends and the attachment ends.

2. The side underride guards of claim 1, the vertical bars being fixed to the structural siderails at the cross beams, respectively.

3. The side underride guards of claim 1, the bracing bars fixed to one structural siderail being paired with the bracing bars fixed to the other structural sidewall, respectively.

4. The side underride guards of claim 3, each of the paired bracing bars being fixed together at a most adjacent point.

5. The side underride guards of claim 1, the guard bars extending parallel to the structural siderails.

6. The side underride guards of claim 1 further comprising
a K-brace adjacent one end of the guard bars and spaced laterally from the cross beams, the K-brace including a brace beam structurally extending between the two structural siderails and spaced from the bed and two struts structurally extending from the brace beam to the two guard bars at the lower end of two of the vertical bars, respectively, defining an air brake hose non-chafing zone between the two struts.

7. A trailer of a tractor-trailer rig, comprising
the side underride guards of claim 1;
aerodynamic side skirts extending downwardly from the trailer bed outwardly of the side underride guards to below the two guard bars;
leaf springs fixed at one end and extending downwardly from the structural siderails to immediately above the two guard bars between the side underride guards and the aerodynamic side skirts, the aerodynamic side skirts being fixed to the leaf springs adjacent the two guard bars.

8. Side underride guards for a tractor-trailer rig having two structural siderails, cross beams extending between the structural siderails and a bed supported by the cross beams on the trailer, comprising
vertical bars extending downwardly from the structural siderails, each vertical bar having an upper end and a lower end, the upper ends of the vertical bars being fixed to the structural siderails;
two guard bars extending beneath the two structural siderails, respectively, and fixed to the lower ends of the vertical bars;
lateral bracing of the guard bars, the lateral bracing including bracing bars, each bracing bar having an anchor end and an attachment end, the anchor ends being fixed to the upper ends of the vertical bars and the attachment ends being fixed to the guard bars at the lower ends of the vertical bars and traversing the trailer between the anchor ends and the attachment ends, the bracing bars fixed to one structural siderail being paired with the bracing bars fixed to the other structural sidewall, respectively, each of the paired bracing bars being fixed together at a most adjacent point.

9. Side underride guards for a tractor-trailer rig having two structural siderails, cross beams extending between the structural siderails and a bed supported by the cross beams on the trailer, comprising
vertical bars extending downwardly from the structural siderails, each vertical bar having an upper end and a lower end, the upper ends of the vertical bars being fixed to the structural siderails;
two guard bars extending beneath the two structural siderails, respectively, and fixed to the lower ends of the vertical bars;
lateral bracing of the guard bars, the lateral bracing including bracing bars, each bracing bar having an anchor end and an attachment end, the anchor ends being fixed to the upper ends of the vertical bars and the attachment ends being fixed to the guard bars at the lower ends of the vertical bars and traversing the trailer between the anchor ends and the attachment ends;
a K-brace adjacent one end of the guard bars and spaced laterally from the cross beams, the K-brace including a brace beam structurally extending between the two siderails and spaced from the bed and two struts structurally extending from the brace beam to the two guard bars at the lower end of two of the vertical bars, respectively, defining an air brake hose non-chafing zone between the two struts.

\* \* \* \* \*